United States Patent Office 3,261,664
Patented July 19, 1966

3,261,664
PROCESS FOR THE PRODUCTION AND SEPARATION OF TITANIUM TETRACHLORIDE FROM CRYSTALLINE FERROUS CHLORIDE
Edward Lawrence Cairns, Newark, Del., and Earl O. Kleinfelder, Antioch, Calif., assignors to E. I. du Pont de Nemours and Company, Wilmington, Del., a corporation of Delaware
No Drawing. Filed Nov. 21, 1963, Ser. No. 325,482
9 Claims. (Cl. 23—87)

This invention concerns the production of titanium tetrachloride by chlorinating ferrotitaniferous materials, and more particularly, it relates to a process for removing ferrous chloride from hot gases containing ferric chloride and titanium tetrachloride resulting from the chlorination of titanium-iron bearing ores and slags.

The prior art is replete with disclosures relative to treating gases resulting from the chlorination of oxidic materials or iron-containing titaniferous materials for the recovery of substantially pure titanium tetrachloride. In the preparation of titanium tetrachloride finely ground ferrotitaniferous material is mixed with a carbonaceous reducing agent such as coke, coal, charcoal and the like and chlorinated by a stream of chlorine gas. The chlorination reaction is performed either in a stationary bed of pressed briquettes containing the ore and the carbonaceous material, or in a fluidized bed of a mixture of the ground ore with carbonaceous material. The chlorination step is usually carried out in a shaft furnace at temperatures within the range of from 500–1400° C., and preferably, depending upon the materials being used, between 700–1000° C. with a temperature of about 800° C. predominating. The hot chlorination gases resulting from this reaction contain primarily titanium tetrachloride and iron chloride impurities, namely ferric chloride and ferrous chloride, which must be separated from titanium tetrachloride. Titanium tetrachloride is a key intermediate chemical used in the preparation of many titanium compounds, for example, wrought titanium, pigmentary titanium dioxide and titanium organic materials of a specialty chemical nature. In most of these chemical preparations it is necessary that the starting material, titanium tetrachloride, be essentially free of iron chloride impurities. However, titanium-bearing ores contain large quantities of iron oxides that are chlorinated along with titanium dioxide. For example, rutile, a titanium-bearing ore may contain about 90–96% titanium dioxide and from 1 to 7% iron oxide, and ilmenite may contain 40–65% titanium dioxide and 30–60% iron oxide. Removal of iron from the chlorination gases has been a serious problem in the production of substantially pure titanium tetrachloride.

In the preparation of titanium tetrachloride the iron chlorides are not only the most difficult impurities to separate from the gaseous stream produced on chlorination, but are also the most troublesome. These impurities show a tendency to condense as a solid directly on the walls of the condensers or other cold surfaces of the process equipment. This frequently results in plugging the apparatus to such an extent that it becomes inoperable. Prior to this invention it has been believed that most of the difficulties in handling the chlorides of iron were overcome if iron was removed from the hot chlorination gases as ferric chloride. Generally, schemes known in the art incorporate a cooling apparatus, or inject cooling liquids into the chlorination gases in order to lower the temperature of said gases to about 200° C. or lower, followed by separation of ferric chloride from cold vapors containing titanium tetrachloride. For example, proposed methods for separating ferric chloride from the gaseous mixture produced on chlorinating ferrotitaniferous materials fall into several categories. One method has been proposed wherein ferric chloride is condensed with titanium tetrachloride by washing the hot chlorination gases with cold liquid titanium tetrachloride. This method produces a suspension of ferric chloride in titanium tetrachloride and, therefore, the separate recovery of ferric chloride from the liquid titanium tetrachloride in a single step is not achieved. Another proposal has been suggested wherein the reaction gases coming from the chlorinator are first cooled to about 15° C., above the snow point temperature of ferric chloride. Then liquid titanium tetrachloride is uniformly injected into the gas so that most of the ferric chloride is condensed and removed from the gas to prevent it from adhering to the walls of the apparatus. This method has several serious drawbacks, for example, it requires precise regulation of the injection of titanium tetrachloride which is the function of the analysis of the gaseous mixture, which in turn can vary because of the ore source. Then too, when the temperature of the gaseous mixture is brought down to such low temperatures as practiced in this method, it is not practically possible to achieve substantially complete evaporation of the liquid titanium tetrachloride injected therein and, therefore, liquid titanium tetrachloride is also precipitated together with ferric chloride. Nor is it possible to obtain complete separation of the solid ferric chloride from the gas stream at a temperature only slightly above the dew point of said chloride. Therefore, precipitation of ferric chloride is incomplete. A third scheme incorporates a two-step process for separating ferric chloride from the chlorination gases containing titanium tetrachloride. The first step consists of chilling the effluent gas stream to a temperature at which the dissociation of ferric chloride into ferrous chloride does not take place. Liquid titanium tetrachloride and chlorine gas have been used to cool the gaseous mixture coming from the chlorinator and dissociation of ferric chloride is prevented by the addition of chlorine gas to the stream as a means of cooling the stream and increasing the partial pressure of chlorine gas. The second step involves further cooling the gases in a spray type condenser to a temperature about 60 to 65° C. above the dew point of titanium tetrachloride.

The prior art methods for separating iron from titanium tetrachloride as represented above, are all based on the fact that iron should be removed from the chlorinating gases at a low temperature as ferric chloride, as illustrated in the following equation:

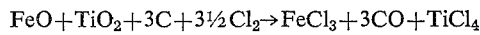

$$FeO + TiO_2 + 3C + 3½Cl_2 \rightarrow FeCl_3 + 3CO + TiCl_4$$

In addition to the above noted limitations found in the processes of the prior art, it can be seen from the above equation that another inherent disadvantage associated with these processes resides in the fact that large quantities of chlorine are discarded as ferric chloride.

An object of this invention, therefore, is to provide a method for removing iron from a gaseous mixture containing titanium tetrachloride in a physical form which facilitates its easy removal. Another object of this invention is to provide a method for removing iron chloride from gases resulting from the chlorination of ferrotitaniferous material in a stable solid form. Another object of this invention is to provide a method for preparing titanium tetrachloride that requires less chlorine consumption than processes used heretofore. A further object of this invention is to provide an economical and effective method that is simple to operate for removing iron chloride from a gaseous mixture containing titanium tetrachloride. Still another object of this invention is to provide a method for preventing clogging of conventional chlorination apparatus caused by the accumulation of iron chloride on the surfaces thereof.

The present invention involves the discovery that iron can be removed as ferrous chloride in a stable, dry crystalline form from a gaseous reaction mixture containing, in addition to ferrous chloride, ferric chloride and titanium tetrachloride resulting from the chlorination of a ferrotitaniferous material. During the chlorination of ferrotitaniferous materials to produce and recover substantially pure titanium tetrachloride it has been found that if the temperature of the gaseous reaction mixture containing the above stated compounds coming from the chlorinator is reduced to within the range of from 500–550° C., and preferably 530–540° C., then ferrous chloride, formed by the decomposition of ferric chloride and ore chlorination, is converted into a stable, dry crystalline solid which is easily removed from the gaseous mixture. Suitable particle sizes of crystalline ferrous chloride that can be easily separated from the gaseous mixture are formed in about 1 to 2 seconds after the gases have been cooled to 500–550° C. These reactions may be represented by the following equations:

$$FeCl_3 \rightleftharpoons FeCl_2 + \tfrac{1}{2}Cl_2$$

$$FeO + TiO_2 + 3C + 3Cl_2 \rightarrow FeCl_2 + TiCl_4 + 3CO$$

It can be seen by comparing the three equations disclosed above that one-half mole of chlorine per mole of ferrous chloride formed is saved in the process of the present invention. Previously, this half mole of chlorine was discarded with the iron chloride, i.e., ferric chloride. Moreover, in this temperature range ferrous chloride is particularly stable under the existing conditions and substantially no chlorination of ferrous chloride to ferric chloride occurs.

Briefly, the method for carrying out the invention can be described by reference to a preferred adaptation thereof utilizing titanium tetrachloride as the cooling agent. A titanium-containing material such as ilmenite is charged into the top of a chlorinator, constructed from firebrick or other resistant refractory material. Chlorine is fed into the bottom of the chlorinator through an inlet. The chlorination gases produced from the reaction of the ore and the chlorine are primarily titanium tetrachloride, ferric chloride and ferrous chloride. These gases are circulated from the chlorinator to a flue cooler similar to that provide in U.S. Patent No. 2,668,424. In one leg of the flue cooler there is provided an injection nozzle for introducing the cooling agent, for example, titanium tetrachloride, into said flue cooler in order to perform the essential step of contacting and cooling the hot chlorination gases to 500° to 550° C., resulting in the condensation of ferrous chloride as a solid. The cooled chlorination gases containing ferric chloride, titanium tetrachloride and now, solid crystalline ferrous chloride, then leave the cooler and may flow into a dust or cyclone-type separator where the solid ferrous chloride and blow-over dust can be discharged and separated from the chlorination gases. The chlorination gases, substantially free of ferrous chloride are passed from the separator to a cooling tower wherein ferric chloride is removed in a conventional manner, that is, the gases are further cooled to at least 250–270° C. by a shower of an inert cooling medium, for example, liquid titanium tetrachloride to a point near to, but above, the dew point of the least volatile metal chloride in the chlorination gases, i.e., titanium tetrachloride, about 65–100° C. The gases are retained in the cooling tower for a period of time sufficient for the formation of large crystals from normally solid ferric chloride, and usually zirconium tetrachloride, and then flow into a cyclone separator where ferric chloride and other solids are removed. The chlorination gases, substantially free of normally solid chlorides, are condensed and titanium tetrachloride recovered and stored as a liquid. After the condensation of titanium tetrachloride, part of the residual gases, for example, chlorine, carbon monoxide and carbon dioxide, which may be partially or completely free of normally solid and normally liquid metal chlorides are recycled to the chlorinator. The cooling agent, e.g., liquid titanium tetrachloride, is partially recycled by means of a pump back into the flue cooler or cooling tower. The excess chlorine gas and non-condensable gases under the conditions of the scrubbing system, i.e., hydrochloric acid, phosgene, carbon monoxide, carbon dioxide, etc., may then be further scrubbed and recycled to the chlorinator for utilization.

An alternative embodiment of the invention, as described above, relates to removing ferrous chloride in the same cyclone separator or filter from which ferric chloride is removed. Once solid dry crystalline ferrous chloride is formed it can also be removed with ferric chloride in a single operation from the gaseous stream of titanium tetrachloride. This is accomplished by merely blowing the crystals of ferrous chloride formed in the flue cooler through the ferric chloride condenser and removing both ferric and ferrous chloride from the gaseous stream of titanium tetrachloride by the same cyclone separator.

The gaseous mixture coming from the chlorinator may be cooled by various means, for example, inert cooling agents in either the liquid or vapor state have been found to be suitable. For instance, cooling may be achieved by contacting the chlorination gases with an inert cooling liquid that evaporates on mixing with the gases. Liquid metal chlorides are particularly effective for regulating the temperature of the gaseous mixture such as, for example, titanium tetrachloride, silicon tetrachloride, carbon tetrachloride and the like. Utilizing these cooling agents has the additional advantage of not introducing any contaminants into the system. It is pointed out that vapors of the metal chlorides and carbon tetrachloride can be used to cool the gases leaving the chlorinator, however, greater efficiency is obtained using a liquid metal chloride, particularly titanium tetrachloride. The evaporating liquid metal chloride, e.g., titanium tetrachloride absorbs at least a part of the heat content of the gases that are released at the initial mixing temperature of 550° C. Additional heat is lost by the gases due to radiation in the cooling unit. In using larger equipment, however, the amount of evaporating liquid cooling the gases may be adjusted so that it will absorb more than 50% and up to as high as 95% of the heat content of the gases necessary to obtain temperatures within the range of 500° to 550° C. The precise amount of liquid titanium tetrachloride or other cooling medium necessary to reduce the temperature of the gas mixture coming from the chlorination furnace to about 500° to 550° C. will vary. The actual amount required for any particular condenser system must be determined on the basis of certain variables, i.e., the temperature of the gaseous mixture being introduced into the condenser to be cooled, the temperature of the cooling agent, the design and degree of insulation of the condenser apparatus and the amount of external cooling, if any, applied to the apparatus must be considered. The amount of cooling agent can be estimated by taking into account the latent heat of vaporization which is liberated by the condensation of ferrous chloride and that which is absorbed by the vaporization of the cooling agent. In any case, the amount of cooling agent added is regulated so that the chlorination gases are cooled rapidly to temperatures within the range of from 500° to 550° C. thus causing the normally solid ferrous chloride to be snowed out of the gaseous stream in such a manner that it can be easily separated from said gas stream containing titanium tetrachloride and other vapors normally associated with this reaction.

Separation of the dry crystalline ferrous chloride from the chlorination gas stream can be accomplished by various techniques known in the art for separating solids from gases. For example, a preferred means involves passing the gaseous mixture and ferrous chloride through a cyclone separating device which is also maintained at 500° to 500° C. Solid, dry crystalline ferrous chloride is separated from the bottom of the vessel and essentially ferrous chloride-free gases leave the top of the vessel. The gases leaving the separator are further processed by passing them into a cooling tower where the gases are cooled to the dew point of titanium tetrachloride causing the residual ferric chloride to precipitate. These gases are then freed of residual ferric chloride by passing them through another cyclone separator or filter device. Normally liquid low boiling titanium tetrachloride and other condensable gases are passed into a condenser and recovered. The condensates are held in a reservoir either to be used as such, recycled in the process or further purified by distillation procedures.

For a further understanding of the invention the following example is presented as illustrative of the process, and is not to be considered as limiting the underlying principles of the invention.

A mixture of ilmenite ore containing 63% $TiO_2$, 2.8% FeO, 25% $Fe_2O_3$, 1% $Al_2O_3$, and trace amounts of other metal oxides such as $SiO_2$, $ZrO_2$, $MnO_2$, $Cr_2O_3$ etc., and petroleum coke were chlorinated at about 900° C. in a furnace. Gas containing about 85% chlorine at room temperature was admitted to the furnace, resulting in an exit gas from the furnace having a percentage composition substantially as shown in Table I. The amount of titanium tetrachloride and ferric chloride produced per hour was about 1,050 parts, containing approximately 160 parts of a ferric, ferrous chloride mixture. The gas leaving the chlorination furnace at approximately 900° C. was then conveyed to the inlet of a flue cooler and cooled to 550° C. within approximately 10 seconds by the injection of titanium tetrachloride at 25° C. The cooler apparatus consisted of six lengths of tubular steel piping each 30" in diameter by 50 feet long, arranged in the form of vertical tubes and suitably connected by a return bend. Water cooling was applied as a continuous cascading external film over the exterior surfaces of the piping. The water temperature at the application point was about 20° C. and after contacting and leaving the cooling surface, its temperature was only slightly higher. During the initial stages of the cooling operation, a deposit of ferric chloride-ferrous chloride condensed from the hot gases onto the interior metal surfaces of the cooling apparatus being retained thereon in a form of a layer which built up to about ¼ to ½ of an inch in thickness at the hot or inlet end of the cooling conduit, and to about 1 to 1¼ inches in thickness at its exit end. As the cooling operation proceeded the exit temperature of the gas from the flue cooler reached about 535° C. At this point titanium tetrachloride injection was balanced to maintain 535°±5° C. for the entire operation. The thickness of the internal skull of ferric-ferrous chloride at this temperature began to decrease until it reached an equilibrium skull of approximately ½ to ¾ of an inch, and remained at approximately that thickness for the entire operation. About 28 lbs. of cold $TiCl_4$ per hundred lbs. of hot chlorination gases was injected into the flues at the second leg after equilibrium conditions had been reached. The chlorination gases, consisting of about 30–35% by volume of titanium tetrachloride, 15–20% of carbon monoxide, 25–30% of carbon dioxide, 5% HCl, and 10–15% ferric-ferrous chloride and other chlorides, were freed of blowover coke dust, unchlorinated material and ferrous chloride by passing the chlorination gases through a cyclone dust separator held at a surface temperature of 500–550° C. Approximately 10 parts of ferrous chloride per every 60 parts titanium tetrachloride passing through the separators is removed. The chlorination gases free of dust and ferrous chloride then pass through a conduit into a cooling tower. Approximately 610 parts of cold recycled liquid titanium tetrachloride was sprayed into the condenser for every 130 parts of hot chlorination gases to lower the chlorination gas temperature to approximately 180–200° C. The gases are then vented to a cyclone separator to remove ferric chloride, and are retained for about 15 seconds in the cyclone separator so that large crystals of the ferric chloride and zirconium tetrachloride will be formed. The dust-free gases are then condensed and liquid titanium tetrachloride is collected at about 25° C. For approximately every part of titanium tetrachloride condensed at 25° C. three quarters of a part was recycled for cooling purposes.

Table I

| Chlorination Exit Stream | Composition | |
|---|---|---|
| | Leaving Chlorinator (Weight Percent) | Leaving $FeCl_2$ Separator (Weight Percent) |
| $TiCl_4$ | 59.0 | 89.9 |
| $FeCl_3$ | 4.7 | 3.3 |
| $FeCl_2$ | 10.0 | 0.2 |
| $Cl_2$ | 0.1 | 0.1 |
| HCl | 2.3 | 0.9 |
| $CO_2$ | 11.7 | 3.2 |
| CO | 4.9 | 1.3 |
| $N_2$ | 2.0 | 0.8 |
| Misc. Chlorides | 1.9 | 0.1 |
| Blowover Solids | 3.4 | 0.2 |

While the example demonstrates the use of chlorinated ilmenite it is pointed out that the invention is not limited to the chlorination gases emitting from ilmenite in the preparation of titanium tetrachloride. The invention applies to any titanium tetrachloride gas containing ferrous and ferric chloride. Such gases result from the chlorination of ilmenite, rutile, beneficiated ilmenite, titanium dioxide containing slags and other ferrotitaniferous materials.

This invention is not a function of, or limited by, the chlorination procedure used or the particular ferrotitaniferous material utilized. However, it is pointed out that heretofore, in the recovery of titanium tetrachloride from ore, every effort was made to prevent the formation of ferrous chloride. Extremes have been taken to insure the stabilization of ferric chloride in the chlorination gas stream, due to the fact that ferric chloride vapor is easier to handle. Some particular advantages realized by the practice of the present invention are: (1) the conservation of chlorine, (2) the conservation of cooling surface needed due to the thinner internal layer of iron chlorides deposited, (3) the decrease in equipment and effort needed to remove iron from titanium tetrachloride downstream of the cyclone separator, and (4) the over-all simplification of the hot chlorination equipment.

While the present invention has been described with particular reference to the treatment of vapors and gases containing titanium tetrachloride and certain other normally liquid and gaseous chlorides it is not limited thereto. The invention may be applied to the treatment of vapors containing various other chlorides as produced by high temperature chlorination of ferrooxidic materials in the presence of a reducing agent. The general principles of the invention are especially applicable to the separation of ferrous chloride from normally liquid metallic chlorides such as chlorides of tin and silica.

We claim:

1. A method for preparing titanium tetrachloride substantially free of ferrous chloride which comprises chlorinating a ferrotitaniferous material in the presence of a reducing agent thereby forming a gaseous mixture at about 900° C. containing titanium tetrachloride, ferrous chloride and ferric chloride, cooling the gaseous mixture to a temperature within the range of from 500–550° C. in order to form stable dry crystalline ferrous chloride, separating the crystalline ferrous chloride from gaseous titanium tetrachloride and recovering titanium tetrachloride.

2. The method according to claim 1 wherein the mixture is cooled to a temperature of from 530–540° C.

3. A method for preparing titanium tetrachloride substantially free of ferrous chloride which comprises chlorinating a ferrotitaniferous material in the presence of a reducing agent thereby forming a gaseous mixture at about 900° C. containing titanium tetrachloride, ferrous chloride and ferric chloride, cooling the gaseous mixture to a temperature within the range of from 500–550° C. with an inert cooling agent in order to form stable dry crystalline ferrous chloride, separating the crystalline ferrous chloride from gaseous titanium tetrachloride and recovering titanium tetrachloride.

4. A method for preparing titanium tetrachloride substantially free of ferrous chloride which comprises chlorinating a ferrotitaniferous material in the presence of a reducing agent thereby forming a gaseous mixture at about 900° C. containing titanium tetrachloride, ferrous chloride and ferric chloride, cooling the gaseous mixture to a temperature within the range of from 500–550° C. with a liquid chloride in order to form stable dry crystalline ferrous chloride, separating the dry crystalline ferrous chloride from gaseous titanium tetrachloride and recovering titanium tetrachloride.

5. A method for preparing titanium tetrachloride substantially free of ferrous chloride which comprises chlorinating a ferrotitaniferous material in the presence of a reducing agent thereby forming a gaseous mixture at about 900° C. containing titanium tetrachloride, ferrous chloride and ferric chloride, cooling the gaseous mixture to a temperature within the range of from 500–550° C. with titanium tetrachloride in order to form stable dry crystalline ferrous chloride, separating the dry crystalline ferrous chloride from titanium tetrachloride and recovering titanium tetrachloride.

6. The process according to claim 5 wherein the cooling agent is liquid titanium tetrachloride.

7. A method for preparing titanium tetrachloride substantially free of ferrous chloride which comprises chlorinating a ferrotitaniferous material in the presence of a reducing agent thereby forming a gaseous mixture at about 900° C. containing titanium tetrachloride, ferrous chloride and ferric chloride, cooling the gaseous mixture to a temperature within the range of from 500–550° C. with sufficient liquid titanium tetrachloride to absorb more than 50% of the heat content of said gaseous mixture and form stable dry crystalline ferrous chloride, passing the resulting mixture through a separator and removing solid crystalline ferrous chloride therefrom, condensing and recovering titanium tetrachloride.

8. A method for condensing as a solid ferrous chloride from a gaseous mixture at about 900° C. containing ferrous chloride, ferric chloride and titanium tetrachloride which comprises cooling the gaseous mixture to a temperature within the range of from 500–550° C. in order to form stable dry crystalline ferrous chloride, separating the dry crystalline ferrous chloride from gaseous titanium tetrachloride and recovering titanium tetrachloride.

9. A method for condensing as a solid ferrous chloride from a gaseous mixture at about 900° C. containing ferrous chloride, ferric chloride and titanium tetrachloride which comprises cooling the mixture to a temperature within the range of from 500–550° C. with sufficient liquid titanium tetrachloride to absorb more than 50% and up to 95% of the heat content of said gaseous mixture and form stable dry crystalline ferrous chloride, separating the dry crystalline ferrous chloride from gaseous titanium tetrachloride and recovering titanium tetrachloride.

References Cited by the Examiner
UNITED STATES PATENTS
2,999,733   9/1961   Groves _____ 23—87

OSCAR R. VERTIZ, *Primary Examiner.*

MAURICE A. BRINDISI, *Examiner.*

E. STERN, *Assistant Examiner.*